United States Patent
Dong et al.

(10) Patent No.: US 9,756,673 B2
(45) Date of Patent: Sep. 5, 2017

(54) DATA SHARING METHOD AND APPARATUS

(71) Applicant: Lenovo (Beijing) Limited, Beijing (CN)

(72) Inventors: Xiao Ping Dong, Beijing (CN); Yi Ning Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 14/826,032

(22) Filed: Aug. 13, 2015

(65) Prior Publication Data

US 2016/0278146 A1  Sep. 22, 2016

(30) Foreign Application Priority Data

Mar. 19, 2015  (CN) .......................... 2015 1 0122845

(51) Int. Cl.
| | |
|---|---|
| *G06F 15/16* | (2006.01) |
| *H04B 5/00* | (2006.01) |
| *H04B 7/00* | (2006.01) |
| *H04W 72/00* | (2009.01) |
| *H04W 76/02* | (2009.01) |
| *H04W 4/04* | (2009.01) |
| *H04W 48/14* | (2009.01) |

(52) U.S. Cl.
CPC .......... *H04W 76/023* (2013.01); *H04W 4/04* (2013.01); *H04W 48/14* (2013.01)

(58) Field of Classification Search
None
See application file for complete search history.

(56) References Cited

U.S. PATENT DOCUMENTS

| | | | |
|---|---|---|---|
| 2008/0195735 A1* | 8/2008 | Hodges | G06F 1/1626 709/227 |
| 2014/0123038 A1* | 5/2014 | Ahn | G06F 3/0488 715/761 |
| 2015/0065046 A1* | 3/2015 | Wilfred | G06F 3/041 455/41.2 |
| 2015/0349848 A1* | 12/2015 | Yang | H04B 5/0031 455/41.1 |

* cited by examiner

*Primary Examiner* — Moustapha Diaby
(74) *Attorney, Agent, or Firm* — Kunzler Law Group

(57) ABSTRACT

Disclosed are a data sharing method used in a first electronic device connected to a second electronic device. A method involves detecting a location relationship between the first electronic device and the second electronic device, determining a share mode of the first electronic device according to the location relationship and determining, according to the share mode, data content to be shared between the first electronic device and the second electronic device. Data sharing may be implemented between devices by setting different access permissions according to the location relationship between the electronic devices.

20 Claims, 5 Drawing Sheets

DATA SHARING METHOD AND APPARATUS

CROSS-REFERENCE TO RELATED APPLICATIONS

This patent application claims priority to People's Republic of China Patent Application No. 201510122845.2 filed on Mar. 19, 2015 for Xiao Ping DONG and Yi Ning LIU, the entire contents of which are incorporated herein by reference for all purposes.

FIELD

The presented embodiments relate to a data sharing by an electronic device.

BACKGROUND

Attendant to the development of communications technology, various portable electronic devices are in wide use. These include portable computers, tablet computers, portable cellular phones, and portable music players. Users have ever increasing requirements on data sharing between portable electronic devices for uses such as sharing of pictures and videos.

In the prior art, data sharing between electronic devices generally comprises connecting two devices by using a data cable, setting different access permissions for different devices, and setting shared content of data according to the access permissions by using authentication measures such as a user identity authentication password. This conventional data sharing method is inconvenient in use and has a low sharing efficiency.

SUMMARY

Embodiments disclosed herein provide a data sharing method between a first electronic device and a second electronic device. The method comprises detecting a location relationship between the first electronic device and the second electronic device; determining a share mode of the first electronic device according to the location relationship; and determining, according to a share mode, which data content is to be shared between the first electronic device and the second electronic device.

Other embodiments provide a data sharing apparatus, used in a first electronic device that is in data communication with a second electronic device. The apparatus in certain embodiments comprises a location relationship detection unit configured to detect a location relationship between the first electronic device and the second electronic device, a share mode determination unit configured to determine a share mode of the first electronic device according to the location relationship, and a shared data determination unit configured to determine according to a share mode, data content to be shared by the first electronic device with the second electronic device.

By using the solutions provided herein, data sharing can be implemented between devices by setting different access permissions according to a location relationship between electronic devices. The above solution simplifies operations of a user, and improves the sharing efficiency.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
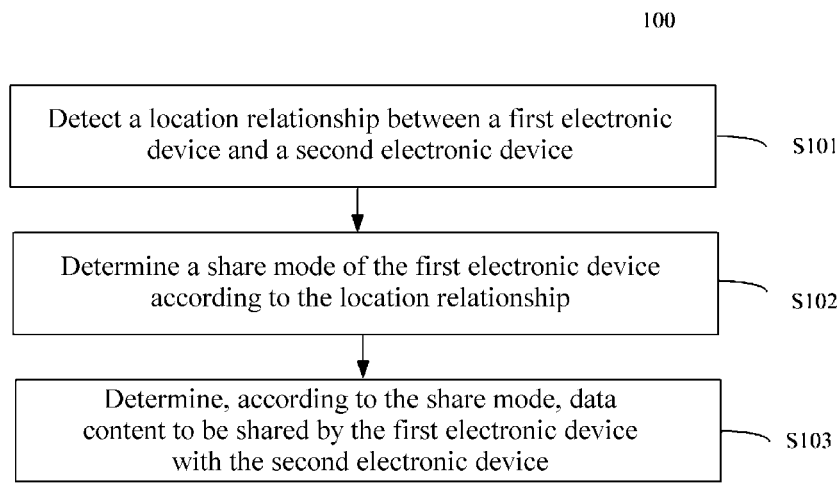
FIG. 1 is a flow chart of a data sharing method according to an embodiment.

In the following, preferred embodiment will be described in detail with reference to the accompanying drawings. It should be noted that, in this specification and the accompanying drawings, essentially identical steps and elements are represented with like reference numerals, and repeated explanations of the steps and elements will be omitted.

Additionally, embodiments may take the form of a program product embodied in one or more computer readable storage mediums storing machine readable code, computer readable code, and/or program code, referred hereafter as code. The storage devices may be tangible, non-transitory, and/or non-transmission. The storage devices do not embody mere signals, though in a certain embodiments, the storage devices only employ signals for accessing code.

In the following embodiments, a first electronic device and a second electronic device refer to devices that can communicate with other devices. A particular form of the first electronic device or the second electronic device includes, but is not limited to: a mobile phone, a personal computer, a digital camera, a personal digital assistant, a portable computer, a game machine, and the like.

Figure 2A:
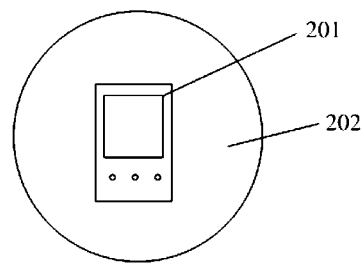
FIG. 2a to FIG. 2c are examples of location relationship between the first electronic device and the second electronic device according to an embodiment.
Figure 2B:
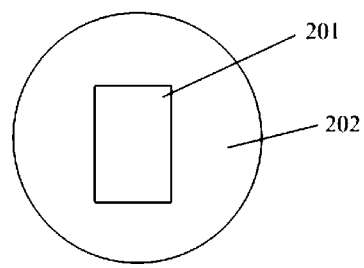
Figure 2C:
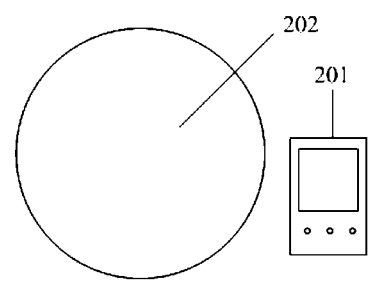

FIG. 1 is a flow chart of an embodiment of a data sharing method 100. FIG. 2a to FIG. 2c show a position of the first electronic device relative to the second electronic device according to the embodiment. Referring to FIG. 1 and FIG. 2a to FIG. 2c, the data sharing method according to the will be described. The data sharing method 100 may be used in the first electronic device, and the first electronic device may be configured to be connected to the second electronic device and implement data sharing between the first electronic device and the second electronic device. According to an example, the first electronic device and the second electronic device are connected through WIFI, Bluetooth, or another means.

For example, the second electronic device may send a wireless signal first to search for other electronic devices nearby, and upon finding the first electronic device, the second electronic device sends its network address and network identity to the first electronic device. After receiving the network identity and the network address of the second electronic device, the first electronic device sends the network identity and the network address thereof to the second electronic device, and after receiving the network identity information of the first electronic device, the second electronic device then sends a connection message to the first electronic device, thereby establishing a connection with the first electronic device. According to another example of the embodiment, the first electronic device may send a search signal first, and establish a connection with the second electronic device when the second electronic device is found.

Referring to the data sharing method 100 of FIG. 1, in step S101, the location relationship between the first electronic device and the second electronic device is detected. According to an example, the location relationship between the first electronic device and the second electronic device may include: in the state that the first electronic device and the second electronic device are in connection, the first electronic device is placed over a surface of the second electronic device having a display screen that is to be used by a user, and is in contact with the second electronic device.

FIG. 2*a* to FIG. 2*c* are examples of the location relationship between the first electronic device and the second electronic device in the data sharing method 100 according to an embodiment. For example, FIG. 2*a* shows that the back side of the first electronic device 201 is in contact with the surface of a second electronic device 202. That is, the first electronic device 201 is placed with the front side facing upwards. FIG. 2*b* shows that the front side of the first electronic device 201 is in contact with the surface of the second electronic device 202. That is, the first electronic device 201 is placed with the back side facing upwards; and in the case that the first electronic device and the second electronic device are in connection, the first electronic device is placed near the second electronic device. For example, FIG. 2*c* shows that the first electronic device 201 is placed at one side of the second electronic device 202.

According to an example, the first electronic device has a spatial location sensor, for example, a gyroscope, configured to detect whether the first electronic device is placed parallel to a horizontal plane. In addition, the front side of the first electronic device may have a display screen to be used by a user, and the back side opposite to the front side may respectively have a first image capturing unit and a second image capturing unit, such as a camera, or a scanner. The first image capturing unit and the second image capturing unit may perform image capturing within their capturing range, so as to detect the location relationship between the first electronic device and the second electronic device. In other embodiments, the position of the first electronic device 201 relative to the second electronic device 202 may be determined from a position-based software configured to track real-time location information of the first electronic device 201 and the second electronic device 202.

In step S102, a share mode of the first electronic device is determined according to the location relationship. According to an example, in step S102, it is initially determined whether a surface of the first electronic device is in contact with the surface of the second electronic device. For example, when a first image captured by the first image capturing unit or a second image captured by the second image capturing unit involves content related to the display surface of the second electronic device, it can be determined that a corresponding surface of the first electronic device is in contact with the display surface of the second electronic device. According to an example, the content related to the display surface of the second electronic device may be a particular pattern, a particular color, a particular brightness, or the like.

In particular, in step S102, the surface of the first electronic device that is in contact with the second electronic device is determined. According to an example, the first image capturing unit and the second image capturing unit may be used simultaneously to capture images, so as to determine the particular surface that is in contact with the second electronic device. For example, after the first electronic device establishes a connection with the second electronic device, if, in step S101, the first image capturing unit on the front side of the first electronic device and the second image capturing unit on the back side are enabled at the same time to capture images within their capturing range, the first image capturing unit and the second image capturing unit respectively capture a first image and a second image. Then, in step S102, it may be determined which image of the first image and second image relates to contents of the display surface of the second electronic device, so as to determine which one of the front side of the first electronic device and the back side of the first electronic device is the particular surface that is in contact with the surface of the second electronic device.

Alternatively, according to another example, only one of the first image capturing unit and the second image capturing unit may be used to capture an image that is used to determine the surface of the first electronic device that is in contact with the second electronic device. For example, it may be determined that the first electronic device is in a first positional state when the first electronic device is placed horizontally with the front side facing downwards. When the first electronic device determines that it is in the first positional state, the image capturing is performed by using the first image capturing unit mounted on the front side of the first electronic device to capture a first image. According to contents of the first image, it is determined whether the front side of the first electronic device is in contact with the surface of the second electronic device.

Alternatively, it may be determined that the first electronic device is in a second positional state when the first electronic device is placed horizontally with the back side facing downwards. When the first electronic device detects that it is in the second positional state, the image capturing will be performed by using the second image capturing unit to capture a second image. Content of the second image is used to determine whether the back side of the first electronic device is in contact with the surface of the second electronic device. When the image captured by the image capturing units on each side of the first electronic device does not involve content that is related to the surface of the second electronic device, it can be determined that neither the front side nor back side of the first electronic device is in contact with the surface of the second electronic device, thereby determining that the first electronic device is not properly located near the second electronic device.

According to an example, after the first electronic device determines that it is in contact with the second electronic device, or determines that it is in the first place state or the second place state, the first electronic device may send a positional state signal to the second electronic device, such that the second electronic device displays a particular display content. In this way, it may be identified whether the first image or the second image captured by the first electronic device comprises the particular display content. When the first image or second image comprises the particular display content, it is determined that a particular surface of the first electronic device is in contact with the surface of the second electronic device.

Subsequently, in step S102, a share mode of the first electronic device is selected according to the determined particular surface. For example, it may be determined that the first electronic device is in a sharing mode when any surface of the first electronic device is in contact with the surface of the second electronic device; and it may be determined that the first electronic device is in a non-sharing mode when no surface of the first electronic device is in contact with the surface of the second electronic device. The share mode may comprise a total share mode and a partial share mode. For example, when the side of the first electronic device opposite to the front side to be used by a user is in contact with the surface of the second electronic device—that is, the front side of the first electronic device, faces upwards, it may be determined that the sharing mode of the first electronic device is a total share mode, and when the front side of the first electronic device that is to be used by a user is in contact with the surface of the second electronic device—that is, the front side of the first electronic device, faces downwards, it may be determined that the sharing mode of the first electronic device is in partial sharing mode. In the partial sharing mode, only part of the files or folders may be accessed by the second electronic device.

In step S103, data content to be shared between the first electronic device and the second electronic device is determined according to the sharing mode. According to an example, the first electronic device sets, according to the total share mode or partial share mode, an attribute to the files or folders corresponding to the data content that has been selected to be shared with the second electronic device, such that the files or folders are accessed by the second electronic device according to the set attribute.

Embodiments may implement data sharing between devices by setting different access permissions according to different location relationships between two electronic devices. Thus, different access permissions may be set according to the manner of arrangement of the two electronic devices, thereby significantly facilitating the sharing operation of a user, simplifying the sharing process, and improving the sharing efficiency.

According to an embodiment, the surface of a second electronic device may be divided into multiple regions first, and different sharing modes can be implemented according to different regions where the first electronic device is placed on the second electronic device.

Figure 3:
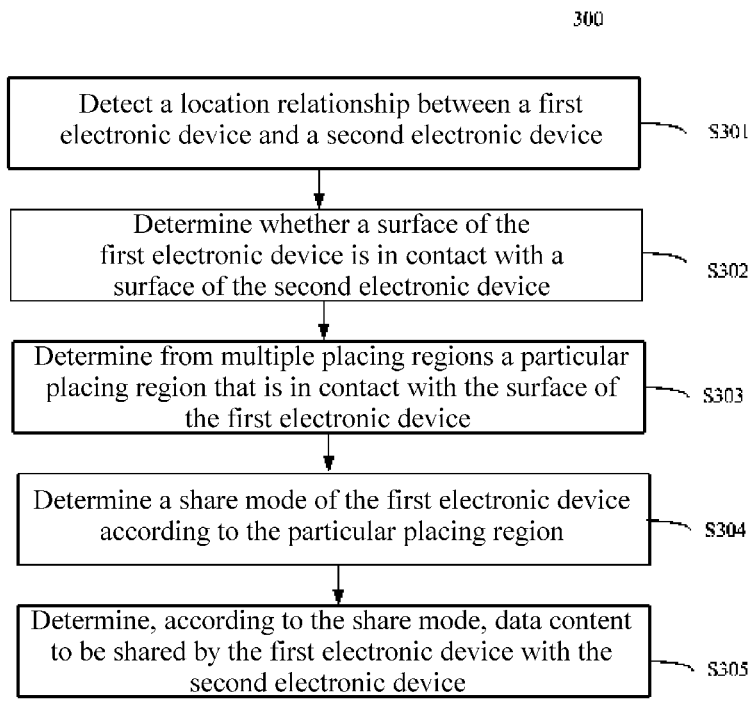
FIG. 3 is a flow chart of a data sharing method according to an embodiment.
Figure 4A:
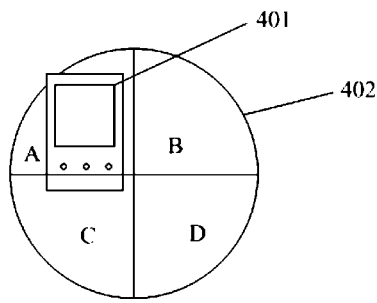
FIG. 4a to FIG. 4c are examples of location relationships between the first electronic device and the second electronic device according to an embodiment.
Figure 4B:
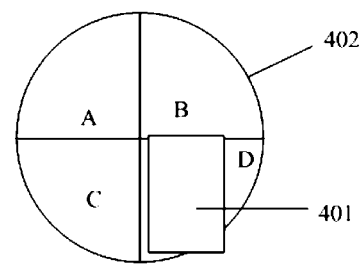
Figure 4C:
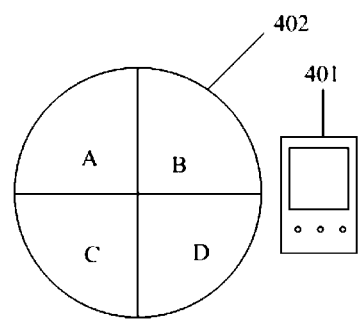

FIG. 3 is a flow chart of a data sharing method 300 according to an embodiment. FIG. 4a to FIG. 4c are schematic diagrams of location relationships between the first electronic device and the second electronic device in the data sharing method 400 according to this embodiment. The data sharing method according to this embodiment will be described with reference to FIG. 3, and FIG. 4a to FIG. 4c. The data sharing method 300 may be used in the first electronic device, and the first electronic device may be configured to implement sharing of data. The first electronic device is connected to the second electronic device. The connection between the first electronic device and the second electronic device is the same as the connection in the data sharing method 100. In this embodiment, the surface of the second electronic device that is to be used by a user may be divided into a plurality of placing regions. For example, the display surface of the second electronic device is divided into 2 to 8 regions. FIG. 4a to FIG. 4c show schematic diagrams in which the second electronic device has four regions, namely, region A, region B, region C and region D. Different sharing modes may be implemented when the first electronic device is placed in different regions of the second electronic device.

Referring to FIG. 3, in step S301, the location relationship between the first electronic device and the second electronic device is detected. In this embodiment, in addition to the location relationships listed in the first embodiment, the location relationship between the first electronic device and the second electronic device may further comprise a location relationship between the first electronic device and a particular placing region of the second electronic device. For example, the location relationship between the first electronic device and the second electronic device may comprise the following: referring to FIG. 4c, when the first electronic device 401 and the second electronic device 402 are in connection state, the first electronic device 401 is placed near the second electronic device 402. Referring to FIG. 4a or FIG. 4b, when the first electronic device 401 and the second electronic device 402 are in connection state, the first electronic device 401 is located over the second electronic device 402 and is in contact with a surface of the second electronic device 402.

The first electronic device 401 being located over the second electronic device 402 and in contact with a surface of the second electronic device 402 further comprises the front side or the back side of the first electronic device 401 that is in contact with the surface of the second electronic device 402 that has a display screen and that is to be used by a user being placed in a particular placing region of the surface of the second electronic device. For example, FIG. 4a shows that the back side of the first electronic device 401 is in contact with the display surface of the second electronic device 402 having a display screen and to be used by a user (that is, the first electronic device is placed with the front side facing upwards), and at least a significant portion of the first electronic device is placed in the region A of the second electronic device. FIG. 4b shows that the front side of the first electronic device 401 is in contact with the display surface of the second electronic device 402 that has a display screen and that is to be used by a user (that is, the first electronic device is placed with the back side facing upwards), and a significant portion of the first electronic device 401 is placed in the region D of the second electronic device.

According to an example, the first electronic device is provided therein with a spatial location sensor that is configured to detect whether the first electronic device is in a horizontal place state parallel to a horizontal plane; in addition, the front side of the first electronic device that is to be used by a user and the back side opposite to the front side may be respectively provided with a first image capturing unit and a second image capturing unit, such as a camera and a scanner. The first image capturing unit and the second image capturing unit may perform image capturing within their capturing range, so as to determine, based on the captured images, the location relationship between the first electronic device and the second electronic device.

Similar to step S102, in step S302, it is determined whether a surface of the first electronic device is in contact with a surface of the second electronic device. For example, when a first image captured by the first image capturing unit or a second image captured by the second image capturing unit involves content that is related to the surface of the second electronic device, it may be determined that a corresponding surface of the first electronic device is in contact with a predetermined surface of the second electronic device.

In step S303, the particular region that is in contact with the surface of the first electronic device is determined from the multiple regions. According to an example, the first image capturing unit and the second image capturing unit may be used to capture images, so as to determine the particular placing region that is in contact with the second electronic device. For example, after the first electronic device establishes a connection with the second electronic device, if, in step S301, the first image capturing unit on the front side of the first electronic device and the second image capturing unit on the back side are enabled to respectively capture images within their capturing range, the first image capturing unit and the second image capturing unit respectively capture a first image and a second image. Then, in step S303, it is determined whether the first image or the second image involves content of a predetermined region of the surface of the second electronic device, so as to determine which region of the second electronic device is in contact with the first electronic device. For example, different regions on the surface of the second electronic device have different features, such as, different colors, different brightness, different textures, and different bar codes, and the region where the first electronic device is placed is determined depending on whether the captured image has such a feature as described above.

According to another example, a sharing mode is determined according to the particular placing region of the second electronic device where the first electronic device is in contact with the second electronic device and the particular surface of the first electronic device where the first electronic device is in contact with the second electronic device. In particular, before or after determination of the particular region of the second electronic device that is in contact with the surface of the first electronic device, it is further needed to determine, from various surfaces of the first electronic device, the particular surface that is in contact with the second electronic device, and then the sharing mode of the first electronic device is determined according to the particular surface and the particular region. According to an example, the first image capturing unit and the second image capturing unit may be used simultaneously to capture images, so as to determine the surface that is in contact with the second electronic device. For example, after the first electronic device establishes a connection with the second electronic device, if, in step S301, the first image capturing unit on the front side of the first electronic device and the second image capturing unit on the back side are enabled at the same time to respectively capture images within their capturing range, the first image capturing unit and the second image capturing unit respectively capture a first image and a second image. Then, in step S303, it is determined which one of the first image and the second image has the preset content of the surface of the second electronic device, so as to determine which one of the front side of the first electronic device and the back side of the first electronic device is the particular surface that is in contact with the surface of the second electronic device.

According to another example, the first image capturing unit and the second image capturing unit may also be used respectively to capture an image, so as to determine the surface that is in contact with the second electronic device. For example, it is initially determined whether the first electronic device is in the first place state where the first electronic device is placed horizontally with the front side facing downward. When the first electronic device determines that it is in the first place state, the image capturing is performed by using the first image capturing unit mounted on the front side of the first electronic device to capture a first image. According to content of the first image, it is determined whether the front side of the first electronic device is in contact with a surface of the second electronic device. Or, it is determined whether the first electronic device is in the second place state where the first electronic device is placed horizontally with the back side facing downward. When the first electronic device determines that it is in the second place state, the image capturing is performed by using the second image capturing unit to capture a second image. According to content of the second image, it is determined whether the back side of the first electronic device is in contact with a surface of the second electronic device. When no image captured by the image capturing unit on each side of the first electronic device involves content that is related to the surface of the second electronic device, it can be determined that the first electronic device is not in contact with the surface of the second electronic device, and the first electronic device is located near the second electronic device.

According to an example, when the first electronic device detects that it is in contact with the second electronic device, or detects that it is in the first place state or the second place state, the first electronic device may send a place state signal to the second electronic device, such that different regions of the second electronic device display different particular display contents. In this way, it may be identified whether the first image or the second image captured by the first electronic device includes the particular display content, so as to determine that the first electronic device is placed in a particular placing region of the second electronic device, and that a particular surface of the first electronic device is in contact with a related region of the second electronic device.

In step S304, the sharing mode of the first electronic device is determined according to the particular region. According to an example, the first electronic device determines the share mode according to the particular region where the first electronic device is in contact with the second electronic device, and the share mode comprises a non-share mode, a totally sharing mode, or a partially sharing mode. For example, a corresponding relationship of a region and a share mode may be defined in advance, and the share mode may be determined according to the corresponding relationship. According to an example, as shown in FIG. 4b, it may be defined that main part of the first electronic device 401 being placed in the region D of the second electronic device 402 corresponds to the totally sharing mode. The first electronic device 401 being placed in the region A of the second electronic device 402 corresponds to the partially sharing mode.

In step S305, data content shared by the first electronic device with the second electronic device is determined according to the share mode. According to an example, the first electronic device sets, depending on the non-share mode, the totally sharing mode or the partially sharing mode, an attribute to the files or folders corresponding to the data content that has been determined to be shared with the second electronic device, such that the files or folders can be accessed by the second electronic device according to the set attribute.

Embodiments can implement data sharing between devices by setting different access permissions according to different location relationships between two electronic devices. Particularly, different access permissions may be set according to place state and placing regions of the two electronic devices, thereby significantly facilitating the sharing operation of a user, avoiding the complicated sharing process in the prior art, and improving the sharing efficiency.

Figure 5:
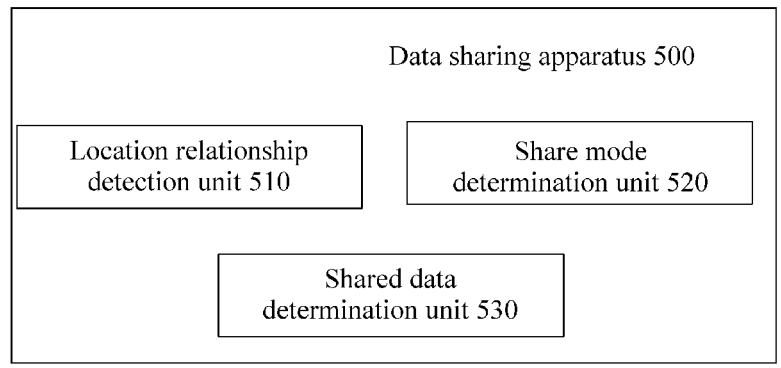
FIG. 5 is a schematic structural block diagram of a data sharing apparatus according to an embodiment.

FIG. 5 depicts a schematic block diagram of a data sharing apparatus 500 according to an embodiment. FIG. 2a to FIG. 2c are examples of location relationships between the first electronic device and the second electronic device according to the third embodiment. Referring to FIG. 5 and FIG. 2a to FIG. 2c, a data sharing apparatus for an embodiment will be described. The data sharing apparatus 500 corresponds to the data sharing method 100, and will only be described briefly. The data sharing apparatus 500 may be used in the first electronic device, and the first electronic device may be configured to be connected with the second electronic device and implement data sharing between the first electronic device and the second electronic device. According to an example, the first electronic device and the second electronic device are connected through WIFI, Bluetooth, or another means.

For example, the second electronic device may send a wireless signal first to search for other electronic devices nearby, and upon finding the first electronic device through search, the second electronic device sends the network address and the network identity thereof to the first electronic device. After receiving the network identity and the network address of the second electronic device, the first electronic device sends its network identity and network address to the second electronic device, and after receiving the network identity information of the first electronic device, the second electronic device further sends a connection message to the first electronic device, thereby establishing a connection with the first electronic device. According to another example of the embodiment, the first electronic device may also send a search signal first, and establish a connection with the second electronic device when the second electronic device is found through search.

Referring to FIG. 5, the data sharing apparatus 500 comprises a location relationship detection unit 510, a share mode determination unit 520, and a shared data determination unit 530.

The location relationship detection unit 510 detects a location relationship between the first electronic device and the second electronic device. According to an example, the location relationship between the first electronic device and the second electronic device may include: in the state that the first electronic device and the second electronic device are in connection, the first electronic device is placed over the surface of the second electronic device having a display screen and to be used by a user, and is in contact with the second electronic device. FIG. 2a to FIG. 2c are examples of location relationships between the first electronic device and the second electronic device in the data sharing apparatus 500 according to the third embodiment. For example, FIG. 2a shows that the back side of the first electronic device 201 is in contact with the surface of a second electronic device 202. That is, the first electronic device 201 is placed with the front side facing upwards. FIG. 2b shows that the front side of the first electronic device 201 is in contact with the surface of the second electronic device 202. That is, the first electronic device 201 is placed with the back side facing upwards. In the case that the first electronic device and the second electronic device are in connection, the first electronic device is placed near the second electronic device. For example, FIG. 2c shows that the first electronic device 201 is placed at one side of the second electronic device 202.

According to an example, the first electronic device has a spatial location sensor that may be a gyroscope and is configured to detect whether the first electronic device is in a place state parallel to a horizontal plane. In addition, the front side of the first electronic device that has a display screen and is to be used by a user and the back side opposite the front side may respectively have a first image capturing unit and a second image capturing unit, such as a camera, or a scanner. The first image capturing unit and the second image capturing unit may perform image capturing within their capturing range, so as to detect the location relationship between the first electronic device and the second electronic device.

The share mode determination unit 520 is configured to determine a share mode of the first electronic device according to the location relationship. According to an example, the share mode determination unit 520 first determines whether a surface of the first electronic device is in contact with a surface of the second electronic device. For example, when either a first image captured by the first image capturing unit or a second image captured by the second image capturing unit involves content that is related to the display surface of the second electronic device, it can be determined that a corresponding surface of the first electronic device is in contact with the display surface of the second electronic device. According to an example, the content that is related to the display surface of the second electronic device may be a particular pattern, a particular color, a particular brightness, or the like.

Then, after it is determined that the first electronic device is in contact with the surface of the electronic device, the share mode determination unit 520 will determine a particular surface that is in contact with the second electronic device from various surfaces of the first electronic device. According to an example, the first image capturing unit and the second image capturing unit may be used simultaneously to capture images, so as to determine the particular surface that is in contact with the second electronic device. For example, after the first electronic device establishes a connection with the second electronic device, if the first image capturing unit on the front side of the first electronic device and the second image capturing unit on the back side are enabled at the same time to capture images of the scene within the capturing range, the first image capturing unit and the second image capturing unit respectively capture a first image and a second image. The share mode determination unit 520 may determine which image of the first image and second image has the preset content of the surface of the second electronic device, so as to determine which one of the front side of the first electronic device and the back side of the first electronic device is the particular surface that is in contact with the surface of the second electronic device.

Alternatively, according to another example, only one of the first image capturing unit and the second image capturing unit is used to capture an image to determine the particular surface that is in contact with the second electronic device. For example, it is determined whether the first electronic device is in the first place state where the first electronic device is placed horizontally with the front side facing downwards. When the first electronic device determines that it is in the first place state, the image capturing is performed by using the first image capturing unit mounted on the front side of the first electronic device to capture a first image. It is determined, according to content of the first image, whether the front side of the first electronic device is in contact with the surface of the second electronic device. Or, it is determined whether the first electronic device is in the second place state where the first electronic device is placed horizontally with the back side facing downwards. When the first electronic device detects that it is in the second place state, the image capturing is performed by using the second image capturing unit to capture a second image. It is determined, according to content of the second image, whether the back side of the first electronic device is in contact with the surface of the second electronic device. When no image captured by the image capturing unit on each surface of the first electronic device involves content that is related to the surface of the second electronic device, it can be determined that neither the front side nor the back side of the first electronic device is in contact with the surface of the second electronic device, thereby determining that the first electronic device is located near the second electronic device.

According to an example, when the first electronic device determines that it is in contact with the second electronic device or determines that it is in the first place state or the second place state, the first electronic device may send a place state signal to the second electronic device, such that the second electronic device displays a particular display content. In this way, it may be identified whether the first image or the second image captured by the first electronic device comprises the particular display content. When the first image or second image comprises the particular display content, it is determined that a particular surface of the first electronic device is in contact with the surface of the second electronic device.

Finally, the share mode determination unit 520 selects a share mode of the first electronic device according to the determined particular surface. For example, it is determined that the first electronic device is in a sharing mode when any surface of the first electronic device is in contact with the surface of the second electronic device, and it is determined that the first electronic device is in a non-share mode when no surface of the first electronic device is in contact with the surface of the second electronic device. The sharing mode may be further divided into a total share mode and a partial share mode. For example, when the side of the first electronic device opposite to the front side that is to be used by a user is in contact with the surface of the second electronic device, that is, the front side of the first electronic device facing upwards, it may be selected that the share mode of the first electronic device is the total sharing mode, and when the front side of the first electronic device that is to be used by a user is in contact with the surface of the second electronic device, that is, the front side of the first electronic device facing downwards, it may be selected that the share mode of the first electronic device is the partially sharing mode. In the partially sharing mode, only part of the files or folders can be accessed by the second electronic device.

The shared data determination unit 530 is configured to determine, according to the sharing mode, data content shared by the first electronic device with the second electronic device. According to an example, the first electronic device sets, according to the totally sharing mode or partially sharing mode, an attribute to files or folders corresponding to the data content that has been determined to be shared with the second electronic device, such that the files or folders can be accessed by the second electronic device according to the set attribute.

Embodiments may implement data sharing between devices by setting different access permissions according to different location relationships between two electronic devices. Particularly, different access permissions may be set according to place state of the two electronic devices, thereby significantly facilitating the sharing operation of a user, simplifying the sharing process, and improving the sharing efficiency.

According to embodiments, the surface of the second electronic device may be divided into various regions in advance, and different share modes are implemented according to different placing regions of the second electronic device where the first electronic device is placed.

Figure 6:
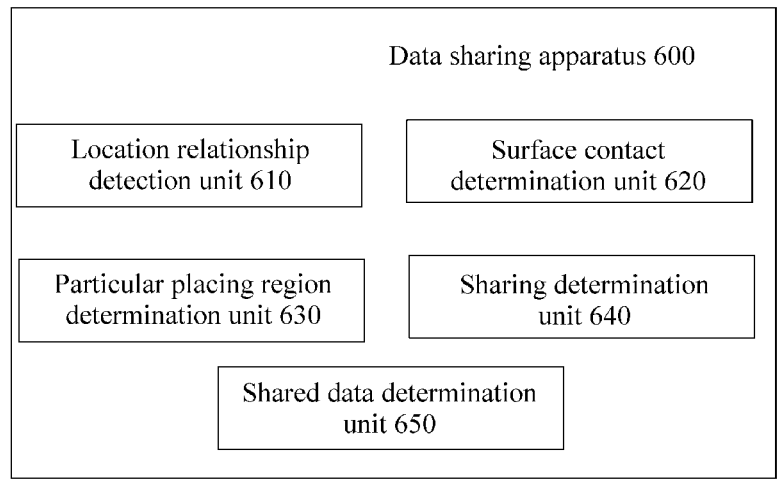
FIG. 6 is a schematic structural block diagram of a data sharing apparatus according to an embodiment.

FIG. 6 describes a schematic block diagram of a data sharing apparatus 600 according to an embodiment. FIG. 4a to FIG. 4c are schematic diagrams of location relationships between the first electronic device and the second electronic device in the data sharing apparatus 600 according to the embodiment. The data sharing method according to the embodiment will be described with reference to FIG. 6, and FIG. 4a to FIG. 4c. The data sharing apparatus 600 corresponds to the data sharing method 300, and will only be described briefly below. The data sharing apparatus 600 may be used in the first electronic device above, and the first electronic device may be configured to implement data sharing. The first electronic device is connected to the second electronic device. The manner of connection between the first electronic device and the second electronic device is the same as the manner of connection in the data sharing method 100. In this embodiment, the surface of the second electronic device that is to be used by a user may be divided into multiple regions. For example, the display surface of the second electronic device is divided into 2-8 regions. FIG. 4a to FIG. 4c show schematic diagrams in which the second electronic device has four regions, namely, region A, region B, region C and region D. Different share modes may be implemented when the first electronic device is placed in different regions of the second electronic device.

Referring to FIG. 6, the data sharing apparatus comprises a location relationship detection unit 610, a surface contact determination unit 620, a particular placing region determination unit 630, a share determination unit 640, and a shared data determination unit 650.

The location relationship detection unit 610 is configured to detect a location relationship between the first electronic device and the second electronic device. In this embodiment, in addition to the location relationships listed in the first embodiment, the location relationship between the first electronic device and the second electronic device may further include a location relationship between the first electronic device and a particular placing region of the second electronic device. For example, the location relationship between the first electronic device and the second electronic device may include the following: referring to FIG. 4c, when the first electronic device 401 and the second electronic device 402 are in the connection state, the first electronic device 401 is placed near the second electronic device 402. Referring to FIG. 4a or FIG. 4b, when the first electronic device 401 and the second electronic device 402 are in the connection state, the first electronic device 401 is located over the second electronic device 402 and is in contact with the surface of the second electronic device 402. When the first electronic device 401 being located over the second electronic device 402 and in contact with the surface of the second electronic device 402, the front side or the back side of the first electronic device 401 may be in contact with the surface of the second electronic device 402 having a display screen and to be used by a user, and is placed in a particular placing region of the surface of the second electronic device. For example, FIG. 4a shows that the back side of the first electronic device 401 is in contact with the display surface of the second electronic device 402 having the display screen and to be used by a user (that is, the first electronic device is placed with the front side facing upwards), and main part of the first electronic device is placed in the region A of the second electronic device. FIG. 4b shows that the front side of the first electronic device 401 is in contact with the display surface of the second electronic device 402 having the display screen and to be used by a user (that is, the first electronic device is placed with the back side facing upwards), and main part of the first electronic device 401 is placed in the region D of the second electronic device.

According to an example, the first electronic device is provided therein with a spatial location sensor configured to detect whether the first electronic device is in a horizontal place state parallel to a horizontal plane; in addition, the front side of the first electronic device that is to be used by a user and the back side opposite to the front side may be respectively provided with a first image capturing unit and a second image capturing unit, such as a camera, or a scanner. The first image capturing unit and the second image capturing unit may perform image capturing on a scene within their capturing range, so as to determine, according to the captured image, the location relationship between the first electronic device and the second electronic device.

The surface contact determination unit 620 is configured to determine whether a surface of the first electronic device is in contact with the surface of the second electronic device. For example, when a first image captured by the first image capturing unit or a second image captured by the second image capturing unit involves content that is related to the surface of the second electronic device, it can be determined that a corresponding surface of the first electronic device is in contact with the predetermined surface of the second electronic device.

The particular region determination unit 630 is configured to determine, from multiple regions, a particular placing region which is in contact with the surface of the first electronic device. According to an example, the first image capturing unit and the second image capturing unit may be used to capture images, so as to determine the particular placing region which is in contact with the second electronic device. For example, after the first electronic device establishes a connection with the second electronic device, if the first image capturing unit on the front side of the first electronic device and the second image capturing unit on the back side are enabled to respectively capture images within their capturing range, the first image capturing unit and the second image capturing unit respectively capture a first image and a second image. Then, the particular region determination unit 630 determines whether the first image or the second image involves content that is related to a predetermined region of the surface of the second electronic device, so as to determine which region of the second electronic device is in contact with the first electronic device. For example, different regions on the surface of the second electronic device have different features, for example, different colors, different brightness, different textures, and different bar codes. The region where the first electronic device is placed is determined according to whether the captured image has a feature as described above.

According to another example, a share mode is determined according to the particular placing region of the second electronic device where the first electronic device is in contact with the second electronic device and the particular surface of the first electronic device where the first electronic device is in contact with the second electronic device. Particularly, before or after determination of the particular region of the second electronic device that is in contact with the surface of the first electronic device, it is further needed to determine, from various surfaces of the first electronic device, the particular surface that is in contact with the second electronic device, and the share mode of the first electronic device is determined according to the particular surface and the particular region. According to an example, the first image capturing unit and the second image capturing unit may be used simultaneously to capture images, so as to determine the surface that is in contact with the second electronic device.

For example, after the first electronic device establishes a connection with the second electronic device, if the first image capturing unit on the front side of the first electronic device and the second image capturing unit at the back side are enabled at the same time to respectively capture images within their capturing range, the first image capturing unit and the second image capturing unit respectively capture a first image and a second image. Then, the particular placing region determination unit 630 determines which one of the first image and the second image has a preset content of the surface of the second electronic device, so as to determine which one of the front side of the first electronic device and the back side of the first electronic device is the particular surface that is in contact with the surface of the second electronic device.

According to another example, the first image capturing unit and the second image capturing unit may be used respectively to capture an image, so as to determine the surface that is in contact with the second electronic device. For example, it is determined whether the first electronic device is in the first place state where the first electronic device is placed horizontally with a front side facing downwards; when the first electronic device determines that it is in the first place state, the image capturing is performed by using the first image capturing unit mounted on the front side of the first electronic device to capture a first image; according to content of the first image, it is determined whether the front side of the first electronic device is in contact with a surface of the second electronic device. Or, it is determined whether the first electronic device is in the second place state where the first electronic device is placed horizontally with the back side facing downwards; when the first electronic device determines that it is in the second place state, the image capturing is performed by using the second image capturing unit to capture a second image; according to content of the second image, it is determined whether the back surface of the first electronic device is in contact with a surface of the second electronic device. When no image captured by the image capturing units on each side of the first electronic device involves content that is related to the surface of the second electronic device, it may be determined that the first electronic device is not in contact with the surface of the second electronic device, and the first electronic device is located near the second electronic device.

According to an example, when the first electronic device detects that it is in contact with the second electronic device, or detects that it is in the first place state or the second place state, the first electronic device may send a place state signal to the second electronic device, such that different regions of the second electronic device display different particular display content. In this way, it may be identified whether the first image or the second image captured by the first electronic device comprises the particular content, so as to determine that the first electronic device is placed in the particular placing region of the second electronic device, and that a particular surface of the first electronic device is in contact with a related region of the second electronic device.

The share determination unit 640 determines the share mode of the first electronic device according to the particular region. According to an, the first electronic device determines the share mode according to the particular region where the first electronic device is in contact with the second electronic device, and the share mode includes a non-share mode, a totally sharing mode, or a partially sharing mode. For example, a corresponding relationship of a region and a share mode may be defined in advance, and the share mode may be determined according to the corresponding relationship. According to an example, as shown in FIG. 4b, it may be defined that main part of the first electronic device 401 being placed in the region D of the second electronic device 402 corresponds the totally sharing mode. The first electronic device 401 being placed in the region A of the second electronic device 402 corresponds to the partially sharing mode.

The shared data determination unit 650 is configured to determine, according to the share mode, data content to be shared by the first electronic device with the second electronic device. According to an example, the first electronic device sets, according to the non-share mode, the totally sharing mode or the partially sharing mode, an attribute to the files or folders corresponding to the data content that is to be shared with the second electronic device, such that the files or folders can be accessed by the second electronic device according to the set attribute.

An embodiment may implement data sharing between devices by setting different access permissions according to different location relationships between two electronic devices. Particularly, different access permissions may be set according to the place state and the region of the two electronic devices, thereby significantly facilitating the sharing operation of a user, avoiding the complicated sharing process in the prior art, and improving the sharing efficiency.

A person of ordinary skill in the art may be aware that, the units and algorithm steps of the examples described in combination with the embodiments disclosed herein may be implemented in the form of electronic hardware, computer software, or a combination of the both. Moreover, a software module may be placed in a computer storage medium in any form. In order to clearly describe interchangeability of hardware and software, the formation and steps of various examples have been described hereinabove in general according to their functions. With respect to whether the functions are performed by hardware or software, it would depend on particular applications and design constraints of the technical solutions. For each particular application, a person skilled in the art may implement the described functions by using different methods; however, such implementations should not be considered as not covered by the scope of the present embodiments.

A person skilled in the art should understand that, various modifications, combinations, partial combinations and alternatives may be made to the present embodiments according to design requirements and other factors, as long as they fall within the scope of the claims and the equivalents thereof.

What is claimed is:

1. A method, comprising:
   establishing a data communication link between a first electronic device and a second electronic device;
   determining whether the first electronic device is in a first positional state and if the first electronic device detects that it is in the first positional state, performing image capturing by using an image capturing unit disposed on the first electronic device to capture a first image;
   detecting, according to content of the first image, whether a principal surface of the first electronic device is in contact with the second electronic device, wherein the principal surface of the first electronic device comprises at least one of a front surface, and a back surface;
   determining whether a position of the first electronic device relative to the second electronic device corresponds to a selected data transfer position in response to the principal surface being in contact with the second electronic device; and
   transferring data between the first electronic device and the second electronic device, responsive to determining that the position of the first electronic device corresponds to the selected data transfer position.

2. The method of claim 1, wherein determining whether said position of the first electronic device relative to the second electronic device corresponds to a selected data transfer position in response to the principal surface being in contact with the second electronic device further comprises:
   determining that said position of the first electronic device corresponds to a data transfer position if the principal surface of the first electronic device is in contact with a display surface of the second electronic device; and
   determining that said position of the first electronic device does not correspond to a data transfer position if the principal surface of the first electronic device is not in contact with the display surface of the second electronic device.

3. The method of claim 1, wherein determining whether the position of the first electronic device relative to the second electronic device corresponds to a selected data transfer position in response to the principal surface being in contact with the second electronic device further comprises:
   determining which principal surface, from a plurality of principal surfaces of the first electronic device, is in contact with the second electronic device, wherein the plurality of principal surfaces of the first electronic device comprises at least one of the front surface, wherein the front surface comprises a display surface, and the back surface; and
   selecting a data sharing mode between the first and second electronic devices according to which of the plurality of principal surfaces is determined to be in contact with the second electronic device.

4. The method of claim 3, wherein:
   the image capturing unit comprises a first image capturing unit disposed on a first principal surface, and the first electronic device further comprises a second image capturing unit disposed on a second principal surface;
   the second principal surface is opposite the first principal surface; and
   determining which principal surface, from the plurality of principal surfaces of the first electronic device, is in contact with the second electronic device comprises:
      capturing the first image and a second image respectively by using the first image capturing unit and the second image capturing unit, and
      determining, according to contents of the first image and the second image, which one of the first principal surface and the second principal surface of the first electronic device is the principal surface that is in contact with the second electronic device.

5. The method of claim 1, wherein a surface of the second electronic device that is in contact with the first electronic device is provided with multiple placing regions, and wherein determining whether the position of the first electronic device relative to the second electronic device corresponds to a selected data transfer position in response to the principal surface being in contact with the second electronic device further comprises:

determining which placing region of the second electronic device, from among multiple placing regions, is in contact with the principal surface of the first electronic device; and determining a data sharing mode between the first and second electronic devices according to which of the multiple placing regions is determined to be in contact with the principal surface of the first electronic device.

6. The method of claim 5, wherein the data sharing mode between the first and second electronic devices depends at least partially upon which principal surface of a plurality of principal surfaces of the first electronic device is determined to be in contact with the placing region of the second electronic device.

7. The method of claim 1, wherein
determining whether the first electronic device is in a first positional state comprises determining whether the first electronic device is in a horizontal state.

8. The method of claim 1, wherein the image capturing unit comprises a first image capturing unit disposed on a first principal surface of the first electronic device, and the first electronic device further comprises a second image capturing unit disposed on a second principal surface, the second principal surface being opposite the first principal surface, and wherein:
determining whether the first electronic device is in a first positional state comprises determining whether the first electronic device is in a second positional state and, responsive to determining that the first electronic device is in the second positional state, performing image capturing by using the second image capturing unit to capture a second image; and
detecting, according to content of the first image, whether a principal surface of the first electronic device is in contact with the second electronic device comprises detecting, according to content of the second image, whether the second principal surface of the first electronic device is in contact with the second electronic device.

9. The method of claim 1, further comprising:
sending, by the first electronic device, a positional state signal to the second electronic device such that the second electronic device displays a display content, responsive to the first electronic device detecting that it is in the first positional state;
identifying whether the first image comprises the display content; and
determining that the first electronic device is in contact with the surface of the second electronic device if the first image comprises the display content as displayed by the second electronic device.

10. The method of claim 1, wherein transferring data between the first electronic device and the second electronic device comprises:
setting an attribute to the data on either the first electronic device or the second electronic device such that only the data with the set attribute is transferred between the first electronic device and the second electronic device.

11. An electronic device, comprising:
an image capturing unit
a processor; and
a memory storing code executable by the processor, the code comprising:
code that operatively establishes a communication link with another electronic device;
code that determines whether the electronic device is in a first positional state and if the electronic device detects that it is in the first positional state, code that performs image capturing by using the image capturing unit to capture a first image;
code that detects, according to content of the first image, whether a principal surface of the electronic device is in contact with the other electronic device, wherein the principal surface of the electronic device comprises at least one of a front surface, and a back surface;
code that operatively determines whether or not a position of the electronic device relative to the other electronic device corresponds to a data transfer position in response to the principal surface being in contact with the other electronic device; and
code that transfers data between the electronic device and the other electronic device if the position of the electronic device corresponds to a data transfer position.

12. The electronic device of claim 11, wherein the code further comprises:
code that operatively determines whether a surface of the electronic device is in contact with a surface of the other electronic device;
code that operatively determines that said position of the electronic device corresponds to a data transfer position if the principal surface of the electronic device is in contact with a display surface of the other electronic device; and
code that operatively determines that said position of the electronic device does not correspond to a data transfer position if the principal surface of the electronic device is not in contact with the display surface of the other electronic device.

13. The electronic device of claim 11, wherein the code further comprises:
code that operatively determines which principal surface from among a plurality of principal surfaces of the electronic device is in contact with the other electronic device, wherein the plurality of principal surfaces of the electronic device comprises at least one of the front surface, wherein the front surface comprises a display surface, and the back surface; and
code that operatively selects a data sharing mode between the electronic device and the other electronic device according to which principal surface of the electronic device is determined to be in contact with the other electronic device.

14. The electronic device of claim 13, wherein a first image capturing unit is disposed on a first principal surface, and wherein the electronic device further comprises:
a second image capturing unit that captures a second image, the second image capturing unit being disposed on a second principal surface, wherein the second principal surface is opposite the first principal surface and wherein the code further comprises code that determines, from the first image and second image, which of the first and second principal surfaces is in contact with the other electronic device.

15. The electronic device of claim 11, wherein a surface of the other electronic device that is in contact with the electronic device is provided with multiple placing regions, and the code further comprises:
code that operatively determines which placing region from among the multiple placing regions of the other electronic device is in contact with the principal surface of the electronic device; and
code that operatively determines a data sharing mode between the electronic device and the other electronic device at least partially based upon the placing region that is determined to be in contact with the principal surface of the electronic device.

16. The electronic device of claim 15, wherein the code that operatively determines the data sharing mode between the electronic device and the other electronic device determines the data sharing mode at least partially based upon which principal surface of a plurality of principal surfaces of the electronic device is determined to be in contact with the placing region of the other electronic device.

17. The electronic device of claim 11, wherein the code that determines whether the electronic device is in a first positional state comprises code that determines whether the electronic device is in a horizontal state.

18. The electronic device of claim 11, wherein the image capturing unit comprises a first image capturing unit disposed on a first principal surface, and wherein the electronic device further comprises a second image capturing unit that captures a second image, the second image capturing unit being disposed on a second principal surface, the second principal surface opposite the first principal surface, and
  wherein the code further comprises code that determines whether the electronic device is in a second positional state, and
  wherein the second image capturing unit captures a second image if the code determines that the electronic device is in the second positional state, and
  further comprising code that determines, according to content of the second image, whether the second principal surface of the electronic device is in contact with a surface of the other electronic device.

19. The electronic device of claim 18, wherein the code further comprises:
  code that, responsive to a determination that the electronic device is in the first positional state, operatively sends a positional state signal to the other electronic device to cause the other electronic device to display a display content;
  code that operatively identifies whether the first image comprises the display content; and
  code that operatively determines that the electronic device is in contact with the other electronic device when the first image or the second image comprises the display content.

20. A program product comprising non-transitory computer readable storage medium that stores code executable by a processor, the executable code comprising code to perform:
  establishing a data communication link between a first electronic device and a second electronic device;
  determining whether the first electronic device is in a first positional state and if the first electronic device detects that it is in the first positional state, performing image capturing by using an image capturing unit disposed on the first electronic device to capture a first image;
  detecting, according to content of the first image, whether a principal surface of the first electronic device is in contract with the second electronic device, wherein the principal surface of the first electronic device comprises at least one of a front surface, and a back surface;
  determining whether a position of the first electronic device relative to the second electronic device corresponds to a selected data transfer position in response to the principal surface being in contact with the second electronic device; and transferring data between the first electronic device and the second electronic device, responsive to determining that the position of the first electronic device corresponds to the selected data transfer position.

* * * * *